Dec. 6, 1927.
L. CROOKE
1,652,000
GRAVITY DUMPING TRUCK BODY
Filed July 10, 1924
3 Sheets-Sheet 1
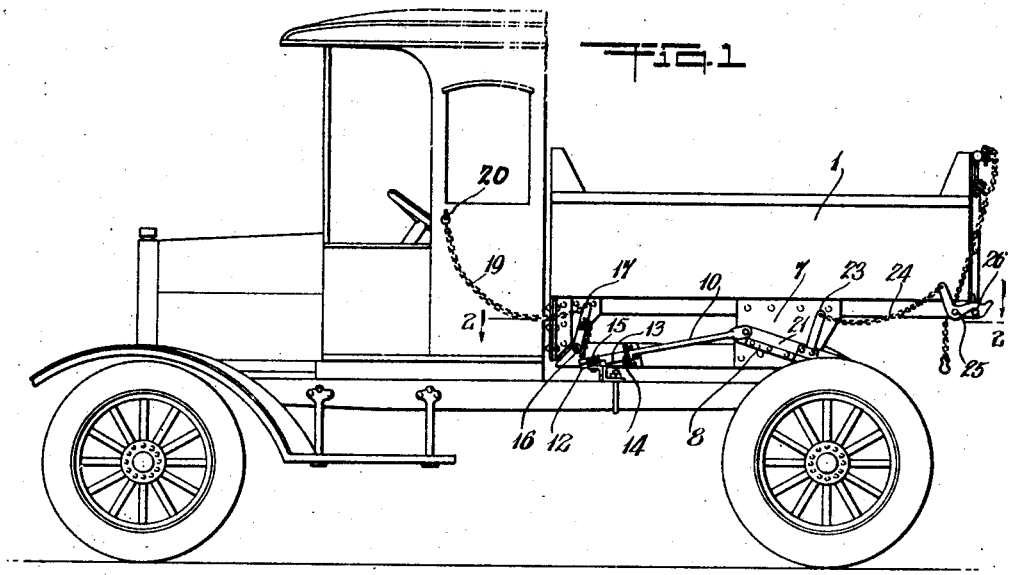
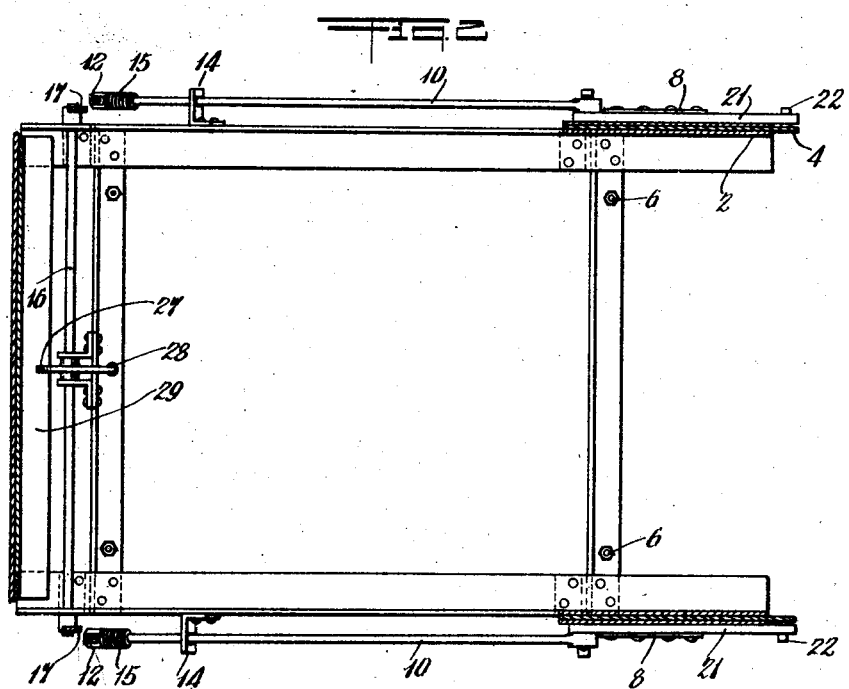
INVENTOR
LEONARD CROOKE
BY
ATTORNEYS

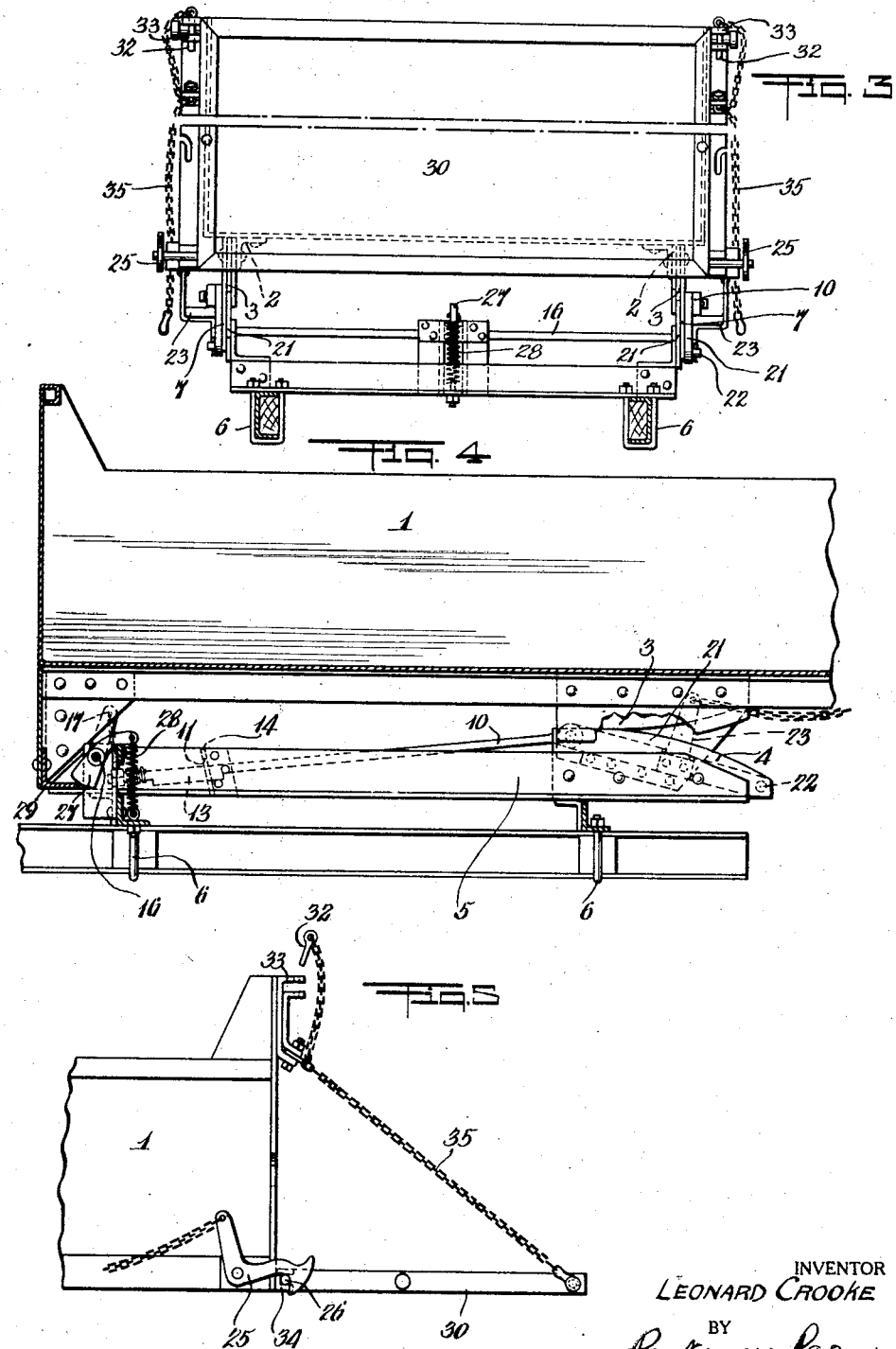

Dec. 6, 1927.

L. CROOKE 1,652,000

GRAVITY DUMPING TRUCK BODY

Filed July 10. 1924

INVENTOR
LEONARD CROOKE
BY
Parker W. Page
ATTORNEYS

Patented Dec. 6, 1927.

1,652,000

UNITED STATES PATENT OFFICE.

LEONARD CROOKE, OF HAGERSTOWN, MARYLAND.

GRAVITY DUMPING-TRUCK BODY.

Application filed July 10, 1924. Serial No. 725,180.

The invention subject of this application for Letters Patent is an improvement in gravity dump bodies for motor trucks, generally applicable, but more especially designed for trucks of small size, and capable of easy and ready operation by the driver without leaving his seat.

These devices are not broadly new, but my improvements are characterized by a novel construction and arrangement of the operative parts of great simplicity and durability, the nature of which may be most readily gathered from the description of the drawings which follows, and in which Fig. 1 is a view in elevation of the complete truck.

Fig. 2 is a sectional view on an enlarged scale of the dumping mechanism taken on the line 2—2 of Fig. 1.

Fig. 3 is a rear end view of the truck.

Fig. 4 is a side and part sectional view of the dump controlling mechanism.

Fig. 5 is a detail side view of the tail gate in one of its possible positions.

Figure 6:
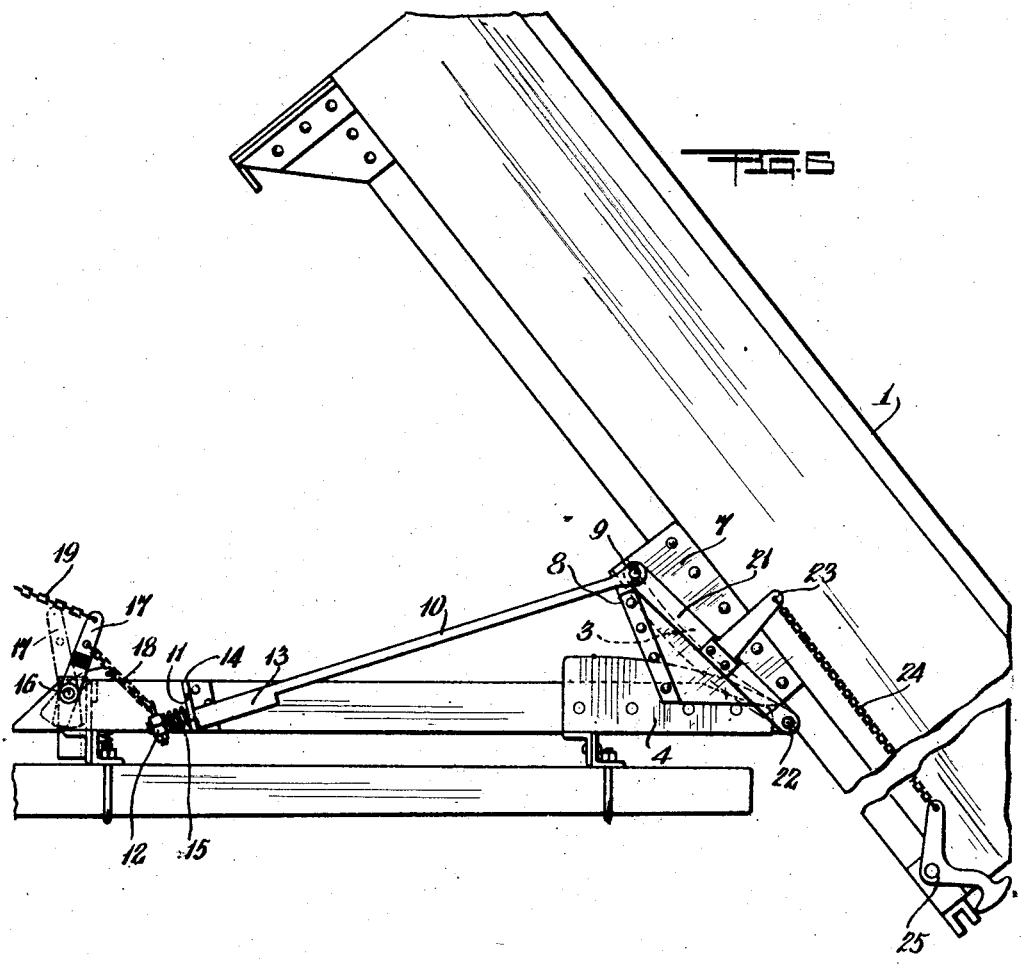
Fig. 6 is a side view of the dumping body in one of its extreme positions.

The truck is or may be of known and desirable construction and requires no detailed description in view of the common knowledge of the art. The truck body 1, however, has secured to brackets 2, attached to opposite sides of the same, rocker plates 3, which rest upon lower rocker plates 4, secured to the sides of the frame 5 which, in turn, is secured to the chassis by U-bolts 6. These rocker plates are shaped substantially as shown in Fig. 6, so that any force applied to and tending to lower the rear end of the body will move it from its normal position shown in Fig. 1, towards its dumping position, shown in Fig. 6.

Over or on the outer sides of the rocker plates 3 are secured wrist plates 7 having raised stops 8 along their lower and outer edges. To said plates 7 at the points 9 are pivoted lock buffer rods 10 which pass through vertically elongated slots 11, as indicated in Figs. 4 and 6 in plates 14 secured to the side frames 5, and terminate in screw heads 12. These rods are provided with flattened portions 13, the forward and rear ends of which form shoulders. Between the forward shoulders and heads 12, there is disposed on each rod a relatively stiff helical buffer spring 15.

A rock shaft 16 is mounted under the forward end of the dumping body and carries two upright arms 17 secured at its ends. Chains 18 connect upper points of these arms with the ends of the buffer rods 10, and to one of said arms 17, at its extreme upper end a chain 19 is connected at one end, the other end being secured to a stud 20 conveniently located within easy reach of the driver.

Secured to the central part of the rock shaft 16 is a latch 27, Figs. 2 and 4, which is connected by a spring 28 with the chassis. When the truck body is in normal position on the frame this latch is forced back by the projecting edge of the body 29, and under the action of the spring 28 slips up over said edge and locks or latches the body against movement. When, however, it is desired to dump the truck, the driver pulls the chain 19 which rocks the shaft 16 and releases the latch 27 from engagement with 29, so that the truck is free to be tilted.

Unlatching a loaded truck in this manner causes it to dump, as when loaded the center of gravity is in a position which causes this. The rods 10 therefore slide back through the plates 14 until arrested by the buffer springs at which time the forward shoulders of the flattened portions drop into engagement with the plates 14 and hold the body in dumping position even after the load is discharged.

The car body is retained in its position on the frame by the means shown in Figs. 1 and 4. Snubbing links 21 are pivotally connected to the points of connection of the rods 10 with the wrist plate pins 9, and to fixed pivot pins 22 on the frame 5, hence as the rods 10 move rearward and the body tilts, these snubbing links swing away from the stops 8, against which they normally lie to the position shown in Fig. 6.

To unlatch or release the tail gate during this operation, a rigid upright arm 23 is secured to one of the snubbing links 21, and connected by a chain 24 with a pivoted latch 25, which normally engages with a pin 26 in the lower corner of the tail gate. As the body tilts, however, the arm 23 swings forward and causes the chain 24 to pull up the latch 25 and so release the tail gate.

When the body is in dumping position the parts are in the relative positions shown in Fig. 6. To restore the body to normal position, therefore, the driver pulls the chain 19, which raises the ends of bars 10 and unlocks them from the plates 14, whereupon the body by the action of gravity, tilts forward and pushes the buffer rods back to normal position after the locking shoulders pass through the slots 11.

It will be observed, therefore, that when unloaded the center of gravity of the body is located at a point which causes the body to return to its normal or horizontal position, but when loaded this balance is disturbed and the body has a tendency to tilt back into dumping position. The change of balance exists because of the shift of the point of contact between rocker plates 3 and 4. When the body is in a horizontal position, Figs. 1 and 4, the point of contact of the plates or fulcrum about which the body is to tilt is located just ahead of the center of gravity of the body and its contents. However, in the unloaded position, Fig. 6, the fulcrum has moved rearwardly and the center of gravity of the unloaded body is ahead or forward of the fulcrum. It is only necessary, therefore, for the driver to release the latch 27 for dumping, and to hold the rear ends of rods 10 up so that the locking shoulders pass through the slots in plates 14 when restoring the body to normal position.

Figure 7:
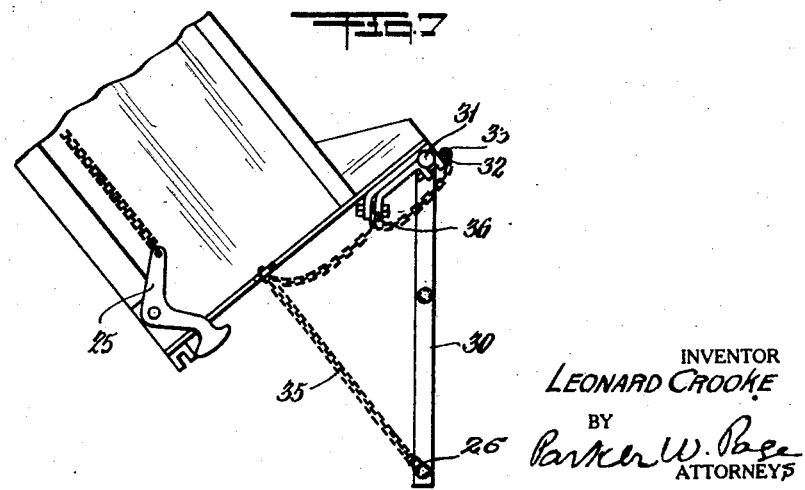
Fig. 7 is a view similar to Fig. 5 of the tail gate in another of the possible positions.

The tail board or gate 30 is composed of a single piece of sheet steel or other suitable material having trunnions 31 at its corners. Normally the upper trunnions or projections are retained by pins 32 between the studs 33, as shown in Fig. 7, the lower projections 26 being adapted to be held between the studs 34 by the latch 25. In this case chains 35 connected to the body and to the tail board limit the swing of the latter as shown in Fig. 7, but when the car is used for express matter, the upper trunnions are withdrawn from between the studs 33 and the lower projections 26 are inserted between the lower studs 34, and the chains 35, connected to the point 36 on the body which will permit the tail board to lie horizontally as shown in Fig. 5.

To the above description but little need be added in explanation of the nature and purpose of the several parts and their mode of operation. It will be observed that as the body rolls to a dumping position the upright arms 23 move with the body, but at a slower rate of speed than the latch 25, thus maintaining the chain 24 reasonably taut at all times, which therefore releases the gate latch at the proper time.

Again the stops 8 on the wrist plates are for the purpose of keeping the body on its supports during jolting over the roads. Besides preventing the body from jumping out of its tracks, these stops tend to prevent either shearing of the fixed pivot pins 22 and pins 9, or bending of the snubbing links 21.

Having now described my invention, what I claim is:

1. A device of the class described comprising, in combination, a frame, a body, rocker plates intermediate said body and said frame, a latch for maintaining said body and said frame in close relation, links, each having one end pivotally connected with said frame and one end pivotally connected with said body, and means adapted to engage a portion of said links when said body is close to said frame whereby the relative position of said body and said frame is prevented from being changed when said latch is in effective position.

2. A device of the class described comprising, in combination, a frame, a body, rocker plates intermediate said body and said frame, rods connected with said body, guide plates on said frame having slots through which said rods may travel longitudinally of themselves, said rods being provided with locking shoulders adapted to engage said guide plates when said body is in dumping position, swinging arms mounted on said frame, flexible means connecting said arms with said rods, and means for swinging said arms and thereby disengaging the locking shoulders of said rods to permit the forward end of said body to return to normal position from a dumping position.

3. A device of the class described comprising, in combination, a frame, a body, rocker plates intermediate said body and said frame, wrist plates secured to said body for maintaining said rocker plates in contacting relation, links having their front ends pivotally connected to the wrist plates and their rear ends pivotally connected with said frame, and means carried by said wrist plates adapted to contact the lower edges of said links when said body is in substantially horizontal position so that only normal dumping movement of said body from a substantially horizontal position is permissible.

4. A device of the class described comprising, in combination, a frame, a body mounted thereon and capable of being tilted on the frame for dumping, side plates secured to the body, buffer rods pivoted to the forward ends of said side plates, means for permitting said rods to move backward as the body is tilted, links pivoted to the points of connection of said rods with the side plates and to fixed pivot pins on the frame, an upright arm secured to one of said links, a tail-gate latch, and a chain connecting the upright arm to said latch whereby tilting of the body will release said latch.

5. A device of the class described comprising, in combination, a frame, a body, rocker plates intermediate said body and said frame, a link pivoted to the frame at the rear of said rocker plates, the forward end of the link being pivotally connected with said body, an arm extending from said link, a tail-gate, a latch for maintaining said tail-gate closed, and means connecting said arm and said latch whereby when said body is tilted to dumping position said latch is displaced.

6. A device of the class described comprising, in combination, a frame, a body, rocker plates intermediate said body and said frame, a link pivotally mounted on said frame and pivotally connected to said body, a tail-gate, a latch for said tail-gate, and means intermediate said latch and said link normally inactive when said body is in normal position and adapted to become active to actuate said latch when said body is displaced relative to said link.

7. A device of the class described comprising, in combination, a frame, a body, rocker plates intermediate said body and said frame, means for preventing relative displacement of said body and said frame comprising a plate extending from said body, a link pivotally connected to said frame and to said plate, means on said plate adapted to contact said link when said body is in normal position so as to prevent separation of contacting rocker plates, and means for locking said body and said frame together at their forward ends.

8. A device of the class described comprising, in combination, a frame, a body, rocker plates intermediate said body and said frame for supporting said body, and a jump preventing lock including a link pivotally connected to said body and to said frame, and means carried by said body for engaging said link when said body is in normal position close to said frame whereby relative linear motion of said body to said frame is prevented.

9. A device of the class described comprising, in combination, a frame, a body, rocker plates intermediate said body and said frame for supporting said body, and a jump preventing lock including a link pivotally connected to said body and to said frame, and means carried by said body for contacting the under edge of said link when said body is in normal position close to said frame whereby said body and said frame cannot be separated in a direction substantially perpendicular.

In testimony whereof I hereto affix my signature.

LEONARD CROOKE.